(12) United States Patent
Furukawa et al.

(10) Patent No.: US 7,496,011 B2
(45) Date of Patent: Feb. 24, 2009

(54) DRIVE APPARATUS, DRIVE METHOD, INFORMATION RECORD MEDIUM HAVING DRIVE PROGRAM, AND INFORMATION PROCESSING APPARATUS FOR DRIVE

(75) Inventors: Junichi Furukawa, Tokorozawa (JP); Kiyoshi Tateishi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 761 days.

(21) Appl. No.: 11/078,700

(22) Filed: Mar. 14, 2005

(65) Prior Publication Data

US 2005/0207295 A1    Sep. 22, 2005

(30) Foreign Application Priority Data

Mar. 16, 2004   (JP) ............................ P2004-075219

(51) Int. Cl.
    *G11B 7/00* (2006.01)
(52) U.S. Cl. .................... 369/47.5; 369/53.27; 369/116
(58) Field of Classification Search ................. 369/116, 369/53.26, 53.27, 47.5, 47.51, 47.52
    See application file for complete search history.

(56) References Cited

U.S. PATENT DOCUMENTS

| 5,790,482 | A  | * | 8/1998 | Saga et al. | 369/47.51 |
| 5,959,943 | A  | * | 9/1999 | Yonezawa et al. | 369/13.35 |
| 6,678,220 | B1 | * | 1/2004 | Saga | 369/44.27 |
| 7,009,924 | B2 | * | 3/2006 | Morishima | 369/47.53 |
| 7,075,868 | B2 | * | 7/2006 | Shigemori | 369/47.31 |
| 7,170,838 | B2 | * | 1/2007 | Toda et al. | 369/53.35 |

* cited by examiner

*Primary Examiner*—Thang V Tran
(74) *Attorney, Agent, or Firm*—Drinker Biddle & Reath LLP

(57) ABSTRACT

A drive apparatus including: a superposition device which superposes a superposition signal on a drive signal for driving a light beam emission device that emits a light beam and which outputs the drive signal on which the superposition signal is superposed to the light beam emission device, a reference clock signal generation device which generates a reference clock signal, a frequency change device which changes a frequency of the superposition signal based on a quality index for indicating a quality of a reproduction signal that is obtained from a reflection light that is the light beam reflected on a record medium, a phase locked loop device which controls the changed frequency so as to be constant by a feedback method in use of the generated reference clock signal.

11 Claims, 6 Drawing Sheets

DRIVE APPARATUS, DRIVE METHOD, INFORMATION RECORD MEDIUM HAVING DRIVE PROGRAM, AND INFORMATION PROCESSING APPARATUS FOR DRIVE

BACKGROUND OF THE INVENTION

1. Field of the Invention

The present invention relates to a technical field of a drive apparatus, a drive method, a program for drive, an Information record medium for drive, and an information processing apparatus for drive. Specifically, the present invention relates to a drive apparatus and a drive method for making a light beam emitting device drive and emit a light beam therefrom, a program for drive used for this drive, an Information record medium in which the program for drive is recorded, and an information processing apparatus including this drive apparatus and being provided for recording or reproducing the information.

2. Related Art

In recent days, when information is recorded into or reproduced from an optical recording medium such as a digital versatile disc (DVD), a laser beam is ordinarily used as a recording and reproducing light beam A element for emitting this laser beam is a semiconductor laser device is frequently used because its cost is low and its size is small.

Because the semiconductor laser device generally emits a laser beam in a so-called single mode, for the purpose such that a noise included in the laser beam is to be reduced, a conventional semiconductor laser device can be driven in a so-called multimode for a conventional record and reproduction of optical information. In this, in order to drive the semiconductor laser device in the multimode, a signal obtained by superposing a superposition signal having a pre-set frequency on a drive signal for the semiconductor laser device is inputted into the semiconductor laser device.

It is known that when the frequency of the superposition signal varies by a reason such as temperature characteristics, a noise increases as a result of the variation. However, in a conventional red color semiconductor laser used for recording information to and reproducing information from a DVD, even though the noise increases as a result of the variation of the frequency of the superposition signal as designated by a broken line in FIG. 1A (in FIG. 1, referred to as a superposition frequency), the noise remains at a level acceptable for the reproduction of information or less, a reproduction itself is not affected as long as for example the intensity of the laser beam is in the vicinity of what required in the reproduction operation. Accordingly, when the conventional red color laser is used, it is unnecessary to consider a countermeasure to the above mentioned frequency variation of the superposition signal.

Meanwhile, in recent yeas, an optical disk having a memory size higher than the conventional DVD is proposed. For this, a blue-violet semiconductor laser is used as a light source for recording information to and reproducing information from the optical disk. In this blue-violet semiconductor laser, a drive signal obtained by superposing a superposition signal is used to drive in a multimode operation for the purpose of reducing the noise in a similar manner to that in the conventional red color semiconductor laser.

However, according to an experiment conducted by an inventor et al of the present invention, in a case where the above blue-violet semiconductor laser is used as a light source, it is confirmed that the amount of noise generated when the superposition signal varies is more in the blue-violet semiconductor laser than in the conventional red color semiconductor laser as shown in FIG. 1B. Further, it is confirmed that the noise components of the blue-violet semiconductor laser may exceed the noise level acceptable to the reproduction even though the intensity of laser beam is in the vicinity of what necessary for the reproduction of the information as shown in FIG. 1B. Further, it is confirmed that the blue-violet semiconductor laser has output characteristics different from those of the red color semiconductor laser as shown in FIG. 1B.

In this, the above mentioned influences of the noise components of the laser beam derived from the frequency variation of the superposition signal can be relatively reduced by increasing the power of the laser beam However, at a time of reproducing information from a rewritable optical disk, there may be a case where a pit for record may be deformed or vanished by the increased intensity of the light beam for the reproduction and thereby the originally recorded information is erased at the time of reproduction.

Thus there has been a demand for a development which can certainly reduce the noise of the laser beam of the multimode operation in the case of using the blue-violet semiconductor laser.

The present invention is provided to solve the above mentioned problems and to provide a drive apparatus, a drive method, a program for drive, an Information record medium for drive, and an information processing apparatus for drive, all of which can respectively prevent the instability of the frequency of the superposition signal for noise reduction from resulting a noise even in a case where the laser intensity is low.

According to a first aspect of the invention, there is provided a drive apparatus including:

a superposition device which superposes a superposition signal on a drive signal for driving a light beam emission device that emits a light beam and which outputs the drive signal on which the superposition signal is superposed to the light beam emission device, a reference clock signal generation device which generates a reference clock signal, a frequency change device which changes a frequency of the superposition signal based on a quality index for indicating a quality of a reproduction signal that is obtained from a reflection light that is the light beam reflected on a record medium, a phase locked loop device which controls the changed frequency so as to be constant by a feedback method in use of the generated reference clock signal.

According to a second aspect of the invention, there is provided a drive apparatus according to the preceding aspect, further including:

a dividing unit included in the phase locked loop device, wherein the frequency change device changes the frequency by changing a dividing ratio in the dividing unit.

According to a third aspect of the invention, there is provided a drive apparatus according to the preceding aspect, wherein the frequency change device changes the frequency in use of the reference clock signal and the dividing ratio of the reference clock signal.

According to a fourth aspect of the invention, there is provided a drive apparatus according to the preceding aspect, further including:

a current change device which changes the current of the superposition signal based on the quality index.

According to a fifth aspect of the invention, there is provided a drive apparatus according to the preceding aspect, further including:

a discrimination device which discriminates whether or not a record medium is a recordable record medium, wherein the current change device changes the current so that the current for the recordable record medium is smaller than a current for a read only record medium as the record medium.

According to a sixth aspect of the invention, there is provided a drive apparatus according to the preceding aspect, wherein the quality index is an error rate or a jitter amount in the reproduction signal.

According to a seventh aspect of the invention, there is provided an information processing apparatus including:

the drive apparatus according to the preceding aspect, wherein the information is subject for at least one of record and reproduction with the emitted light beam.

According to an eighth aspect of the invention, there is provided a drive method including:

a superposition step for superposing a superposition signal on a drive signal for driving a light beam emission device which emits a light beam and for outputting the drive signal on which the superposition signal is superposed to the light beam emission device, a reference clock signal generation step for generating a reference clock signal, a frequency change step for changing a frequency of the superposition signal based on a quality index for indicating a quality of a reproduction signal that is obtained from a reflection light that is the light beam reflected on a record medium, and a control step for controlling the changed frequency so as to be constant by a feedback method using a phase locked loop device.

According to a ninth aspect of the invention, there is provided a drive method according to the preceding aspect further including:

a current change step for changing a current of the superposition signal based on the quality index.

According to a tenth aspect of the invention, there is provided an information medium having a program tangibly demonstrating function comprising steps of:

superposing a superposition signal on a drive signal for driving a light beam emission device that emits a light beam and which outputs the drive signal on which the superposition signal is superposed to the light beam emission device, and controlling a frequency changed by the computer working as a frequency change device so as to be constant by a feedback in use of the generated reference clock signal, wherein the computer is driven by the drive program to work as the frequency change device which changes the frequency of the superposition signal based on the quality index indicative of a quality of a reproduction signal obtained from a reflection light that is the light beam reflected on a record medium.

According to an eleventh aspect of the invention, there is provided the information record medium having the program according to the preceding aspects, wherein the computer is driven to work also as a current change device which changes a current of the superposition signal based on the quality index.

DESCRIPTION OF THE PREFERRED EMBODIMENTS

Figure 1A:
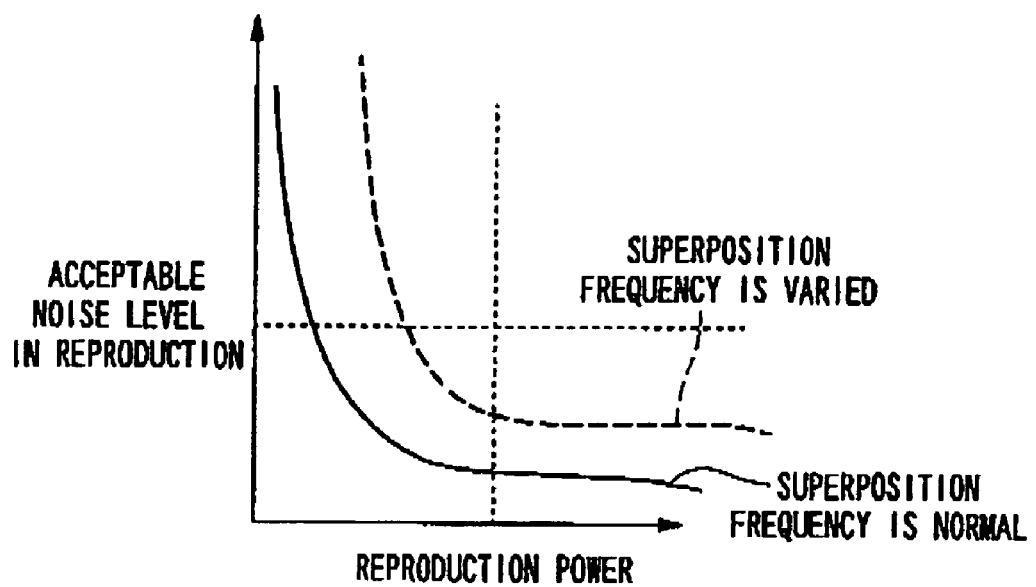
FIG. 1A is a graph for explaining a situation in using a red color semiconductor laser.
Figure 1B:
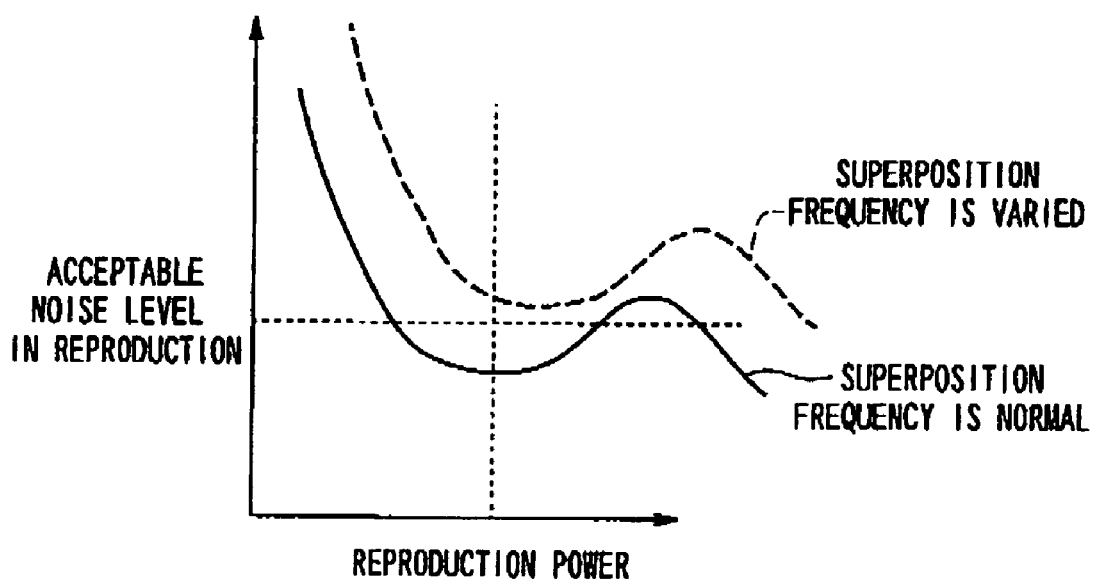
FIG. 1B is a graph for explaining a situation in using a blue-violet semiconductor laser.

Preferred embodiments of the present invention will be described in conjunction with the figures. The embodiments are about a case where the present invention is applied to a drive apparatus for a blue-violet laser equipped in an information record and reproduce apparatus that can record information to and reproduce information from a recordable optical disk and reproduce information from a read only type optical disk. The drive apparatus is to oscillate the semiconductor laser in a multi mode by superposing a superposition signal of a high frequency to the driving signal for driving the semiconductor laser and to reduce a noise in the laser beam emitted by the oscillation.

Hereinafter, each meaning of the reference numbers in the drawings is as follows:

1: semiconductor laser, 2: monitor, 3: subtracter, 4:control unit, 5: divider, 6: CPU, 7: PLL circuit, 8 HF driver, 9: crystal oscillator, 10:phase detection unit, 11:loop filter, 12: VCO, 13: dividing unit, 14: lock detection unit, 15: adder, 16: detector, 17: reproduction process unit, 18: jitter detection unit, D: drive apparatus, and DK: optical disk.

Embodiment 1

Figure 2:
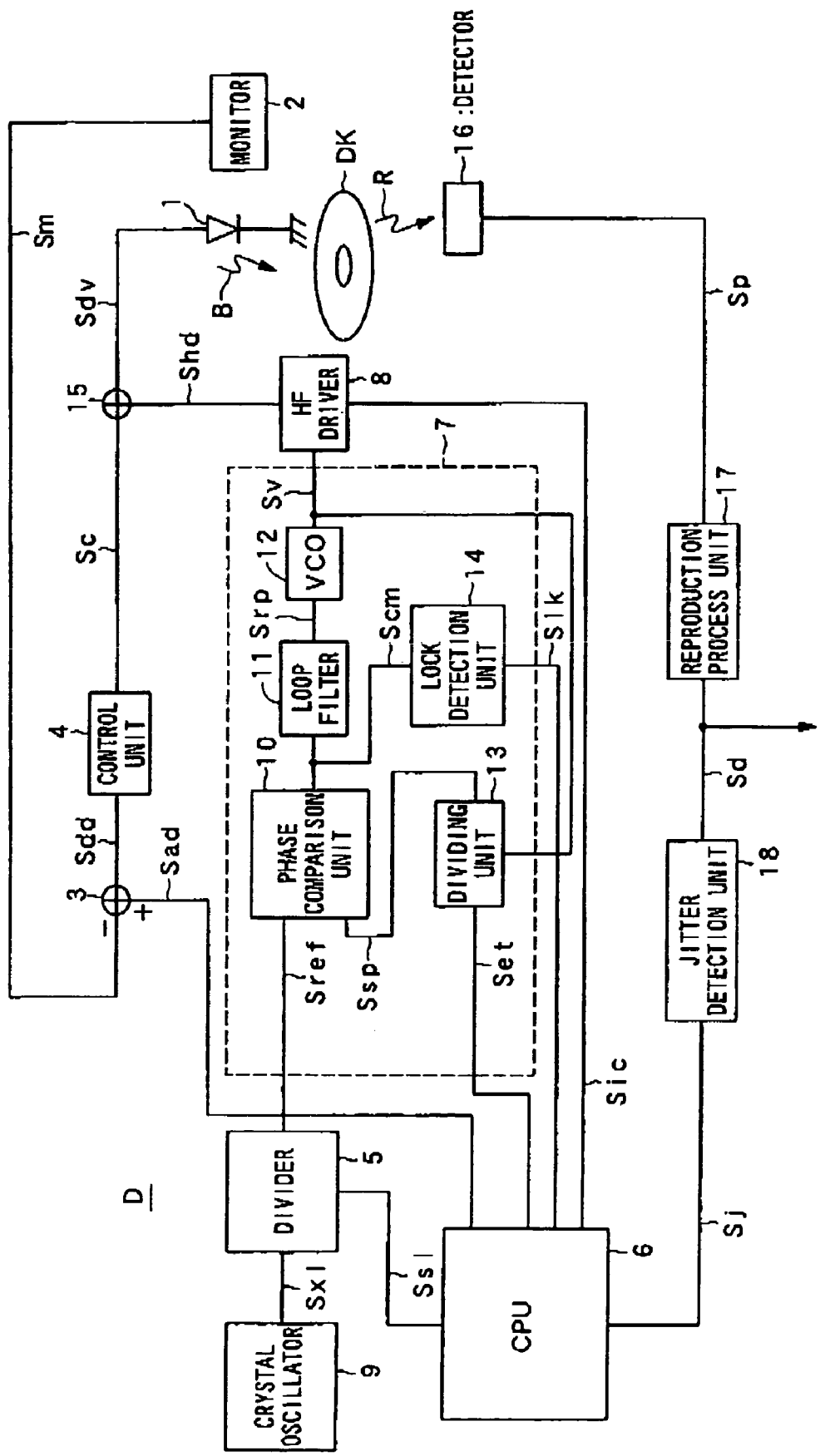
FIG. 2 is a block chart for showing a schematic structure of a drive apparatus according to an embodiment.
Figure 3:
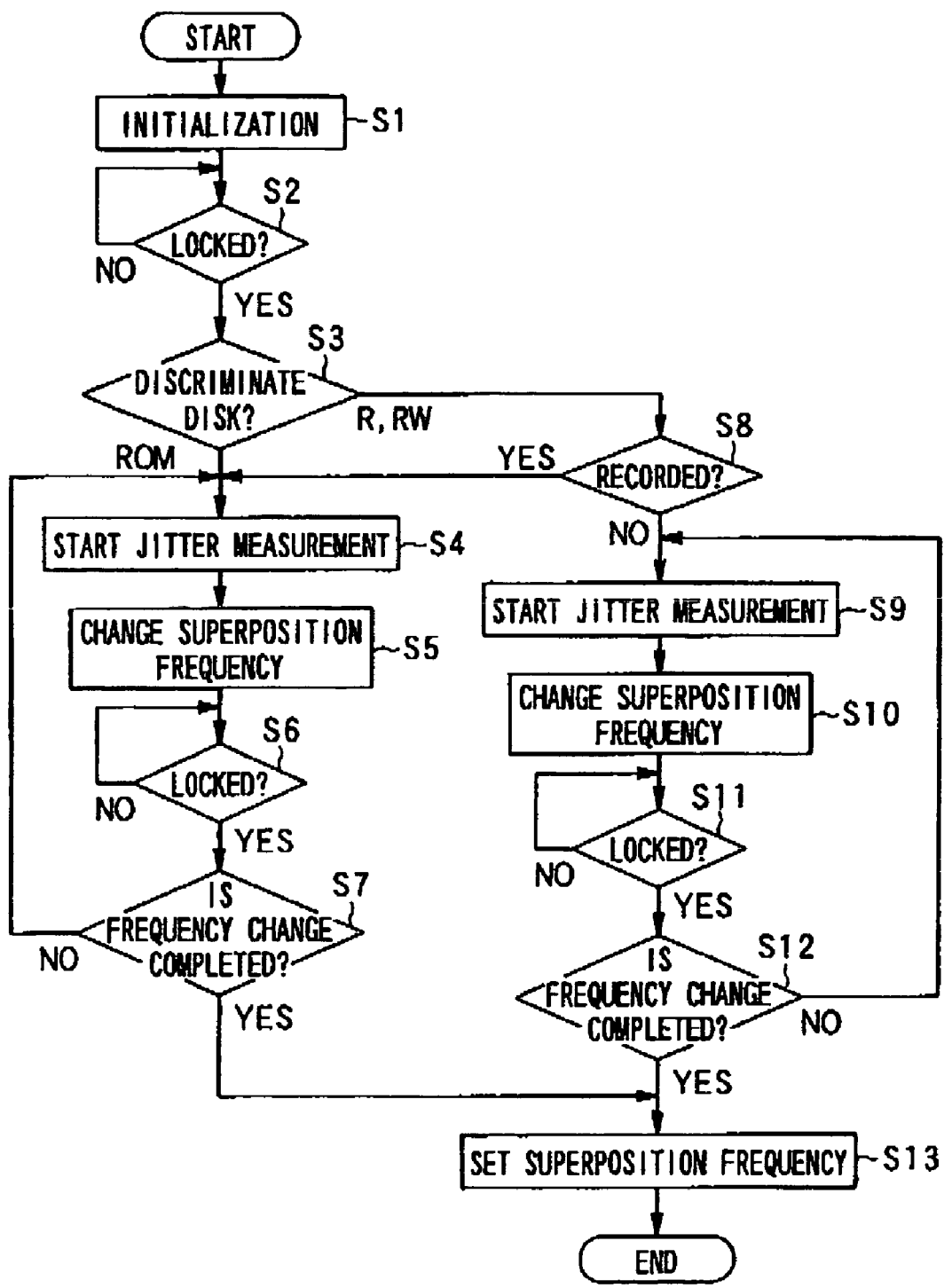
FIG. 3 is a flow chart for showing a frequency stabilization operation of a drive apparatus according to an embodiment.

First, Embodiment 1 according to the present invention is described in reference of FIGS. 2 and 3. FIG. 2 is a block chart showing a schematic structure of a drive apparatus according to Embodiment 1. FIG. 3 is a flowchart showing an operation of the drive apparatus.

As shown in FIG. 2, the drive apparatus D according to Embodiment 1 includes a blue-violet semiconductor laser device (hereinafter simply referred to as a semiconductor laser), a monitor, a subtracter 3, a control unit 4, a divider 5, a CPU 6, a PLL circuit 7, a high frequency (HF) driver 8, a crystal oscillator 9 as a reference clock generator, an adder 15, a detector 16, a reproduction process unit 17, and a jitter detection unit 18.

Further, the PLL circuit 7 as a locked loop device includes a phase comparison unit 10, a loop filter 11, a voltage controlled oscillator (VCO) 12, a divider 13 as a dividing unit 13, a lock detection unit 14.

Next, operations of various portions will be described.

First, when information is recorded or reproduced after loading an information recording and reproducing apparatus with an optical disk (not shown), a drive signal Sc for driving a the semiconductor laser 1 is generated in the control unit 4 and thereafter the adder 15 adds a superposition signal Shd (to be described below) from the HF driver 8 to the drive signal. The obtained signal is outputted to the semiconductor laser 1 as an added drive signal Sdv. The semiconductor laser 1 emits a blue-violet laser beam B and irradiates it on the optical disk DK through an object lens (not shown). A reflection light R, which is the above laser light B reflected on the information recording surface, is then received by a detector 16. The detector 16 generates a light receipt signal Sp and outputs it to the reproduction process unit 17.

Meanwhile, a part of the light beam B emitted from the semiconductor laser 1 is received by a monitor 2 which is disposed in the vicinity of the semiconductor laser 1, where a monitor signal Sm corresponding to the intensity of the received light is generated and outputted to one of the terminals of the subtractor 3.

CPU 6 outputs a target value signal Sad representing a target value, i.e. the intensity of the light beam B, of the output power of the semiconductor laser 1 to the other terminal 3 of the subtractor 3. The subtractor 3 subtracts a monitor signal Sm from the target value signal Sad to generate a difference signal Sdd and returns it to the control unit 4.

Accordingly, an automatic feedback control is conducted so that the light beam B of an intensity corresponding to the target value represented by the target value signal Sad is emitted from the semiconductor laser 1 by a feedback circuit that is made up of the control unit 4, the adder 15, the semiconductor laser 1, the monitor 2, and the subtractor 3.

Meanwhile, the PLL circuit 7 demonstrates a function of stabilizing the frequency (hereinafter, referred to as a superposition frequency) of the above superposition signal Shd in use of the reference clock signal Sref outputted from the divider 5 under control of the CPU 6.

The phase comparison unit 10 in the PLL circuit 7 compares the phase of the reference clock signal Sref and the phase of the divide signal Ssp from the dividing unit 13 and generates a comparison signal Scm representing the difference outputs it to the loop filter 11 and the lock detection unit 14

Then the loop filter 11 removes a high frequency component in the comparison signal Scm and outputs to the VCO 12 as a filter signal Srp.

Then, the VCO 12 generates an oscillation signal Sv having a frequency corresponding to the voltage of the filter signal Srp and also feeds it back to the dividing unit 13.

The HF driver 8 has a frequency same as that of the oscillation signal Sv, generates the above superposition signal Shd having an electric current (hereinafter referred to as a superposition current) represented by the current set signal Sic, and also outputs the superposition signal to the adder 15. By driving the semiconductor laser 1 after adding the superposition signal Shd to the drive signal Sc, the multi mode drive of the semiconductor laser 1 is attained to thereby reduce a noise contained in the laser light B.

Meanwhile, the divider unit 13, to which the oscillation signal Sv is fed back, divides the oscillation signal Sv based on the superposition frequency, i.e. a superposition frequency with respect to the semiconductor laser 1, which is represented by the frequency set signal Set received from the CPU 6, generates the above dividing signal Ssp, and outputs the dividing signal Ssp to the phase comparison unit 10.

The lock detection unit 14, to which the comparison signal Scm is inputted, constantly monitors a phase difference between the phase of the reference clock signal Sref and the phase of the dividing signal Ssp, wherein the phase difference is represented by the comparison signal Scm. By detecting an event that the phase difference becomes substantially zero, it is discriminated that the frequency, i.e. the superposition signal, of the oscillation signal Sv is stabilized. When the stabilization is discriminated, a detection signal Slk showing the stabilization is generated and outputted to the CPU 6.

Meanwhile, a crystal oscillation signal Sxl is inputted t from the crystal oscillation unit 9 into the divider 5. The crystal oscillation signal is divided by a dividing ratio that is preset based on a control signal from CPU 6, and the divider 5 outputs the crystal oscillation signal Sxl after dividing this as the reference clock signal Sref to the phase comparison unit 10.

The crystal oscillation signal Sxl may be used as a reference clock signal for managing operations of the another component forming the information record and reproduce apparatus other than the drive apparatus D according to this embodiment.

Next, in the reproduction unit 17, to which the light receipt signal Sp is inputted from the detector, predetermined decode and amplification processes are provided to the light receipt signal Sp and the reproduction signal Sd containing information to be reproduced from the optical disk DK is generated and outputted to the reproduction unit (not shown) and the jitter detection unit 18.

The jitter detection unit 18 extracts components of jitter contained in the reproduction signal Sd, generates a jitter detection signal Sj representing the jitter amount, and outputs it to the CPU 6.

The CPU 6 changes the jitter detection signal Sj to render the superposition frequency a frequency readout of minimizing the jitter amount that is represented by the jitter detection signal Sj on the basis of the jitter and outputs it to the divider 13.

Further, in parallel to the above mentioned operations of the components, the CPU generates a control signal Ssl, the current set signal Sic, and the target value signal Sad in order to realize the operations of the components, outputs these signals to the components, and overall controls the other components (not shown) in the information record and reproduce apparatus.

Next, an operation of generating the addition drive signal Sdv conducted mainly by the CPU 6 of the drive apparatus having the above structure will be specifically described in reference of FIGS. 2 and 3.

In the operation of generating the addition drive signal Sdv, the reference clock signal Sref is first generated on the basis of the crystal oscillation signal Sxl and outputted to the phase comparison unit 10. In this the superposition frequency is a preset initial value. The above current set signal Sic is generated to be a normal preset value and outputted to the HF driver 8 to thereby initiate addition (superposition) of the superposition signal Shd to the drive signal Sc in Step 1.

Next it is confirmed whether or not the frequency of the superposition signal is stabilized under this situation in Step S2. When it is not stable yet along "NO" in Step S2, a feedback operation is repeated until the frequency is stabilized. On the other hand, when it is stable along "YES" in Step S2, it is confirmed whether or not the operation conducted in the information record and reproduce apparatus is a record operation to an recordable optical disk on the basis of a discrimination of a type of disk performed in a disk type discriminating unit (not shown) and so on in Step S3.

When the record operation is conducted along "R,RW" in Step S3, it is checked whether or not any information is recorded in the recordable optical disk DK which is loaded into the information record and reproduce apparatus according to this embodiment in Step S8. When the recorded information exists in the recordable optical disk DK along "YES" in Step S8, transition is toward the below described Step S4 so as to process as in a case of the below described read only optical disk DK. Meanwhile, when the recordable optical disk DK is unrecorded along "NO" in Step SB, a wobble signal detected from a wobble truck that is formed in the optical disk DK is detected by the detector 16 and the reproduction process unit 17, and it is started to measure the jitter amount in the detected wobble signal in Step S9.

Therefore, when the jitter amount contained in the light receipt signal Sp (reproduction signal Sd) that is obtained when the semiconductor laser 1 is driven in use of the addition drive signal Sdv which is obtained by adding the present superposition signal to the drive signal Sc, the detected jitter amount is temporarily stored in a memory (not shown) inside the CPU 6. Then the present jitter amount is changed by as much as the preset change amount in Step S10. In Step S11, it is confirmed whether or not the superposition signal is stabilized by the changed frequency.

When it is not stabilized yet along "NO" in Step S11, a feedback operation in the PLL circuit 7 is repeated until it is stabilized. On the other hand, when it is stabilized along "YES" in Step Sll, it is confirmed whether or not changes of the superposition frequencies are done completely in a preset change range of the superposition frequencies as the process of Step S10 in Step S12.

When if all the superposition signals in the range to be changed are not completely changed along "NO" of Step S12, the superposition signal changed in the immediately preceding Step S10 is used to temporarily store the jitter amount that is obtained when the superposition signal is superposed onto the drive signal Sc. Thereafter, the above Step S9 is selected again to measure the jitter amount for the superposition signal in the unchanged range. Meanwhile, when the superposition frequencies are changed within the range to be completely changed along "YES" in Step S12, the superposition frequency having the least jitter amount is set and registered in the CPU 6 as the superposition signal used for the following record and reproduce process in Step S13. Thus the superposition frequency set process is for the semiconductor laser is completed.

On the other hand, in the discrimination of Step S3, no more record operation is not performed When the reproduction operation is conducted along "ROM" in Step S3, information recorded in the optical disk DK that is currently loaded into the information record and reproduce apparatus is detected by the detector 16 and the reproduction process unit 17 and the jitter amount contained in the reproduction signal Sd corresponding to the detected information in Step S4.

Thereafter, the jitter amount contained in the light receipt signal Sp (reproduction signal Sd) is detected as in a manner similar to that in the above recordable optical disk DK, the detected jitter amount is temporarily stored in a memory (not shown) in the CPU 6. Next, the current superposition frequency is changed as much as the preset change amount in Step S5. Thereafter, it is confirmed whether or not the superposition frequency is stabilized in the changed frequency in Step S6.

When it is still not stabilized along "NO" in Step S6, a feedback operation is conducted in the PLL circuit 7 until the superposition frequency is stabilized. Meanwhile, in Step S7, when it is stabilized along "YES" in Step 56, it is confirmed whether or not the changes of the superposition frequencies are completed in the entire preset range of the superposition frequency change as the process for the above Step S5.

In the determination of Step S7, when the superposition frequency has not been changed yet along "NO" in Step S7, the process returns to Step S4 in order to measure the jitter amount for the superposition frequency in the unchanged range. On the other hand, the superposition frequency has been changed in the range to be changed along "YES" in Step S7, the superposition frequency having the minimum jitter amount is set and registered in the CPU 6 as the superposition frequency used for the succeeding record and reproduction process in Step S13. Thus the superposition frequency setting process for the semiconductor laser according to Embodiment 1 is completed.

As described above, according to the generation process of the addition drive signal Sdv in the drive apparatus D according to Embodiment 1, since it is controlled to make the superposition signal constant by the feedback method using the reference clock signal Sref, the instable frequency of the superposition signal Shd for the noise reduction can be prevented from causing a noise of the light beam B.

Further, since the frequency of the superposition signal Shd is made constant using the PLL circuit 7, it is possible to make the frequency constant in use of such a simple and general-purpose structure.

Further, the frequency can be controlled in use of such a simple structure since the dividing ratio in the dividing unit 13 can be changed by the frequency set signal Set from the CPU.

Furthermore, since the superposition signal is optimized by detecting the jitter amount in the reproduction signal Sd, the superposition frequency is can be optimized using an actual reproduction result and the most suitable superposition signal is obtainable.

Embodiment 2

Figure 4:
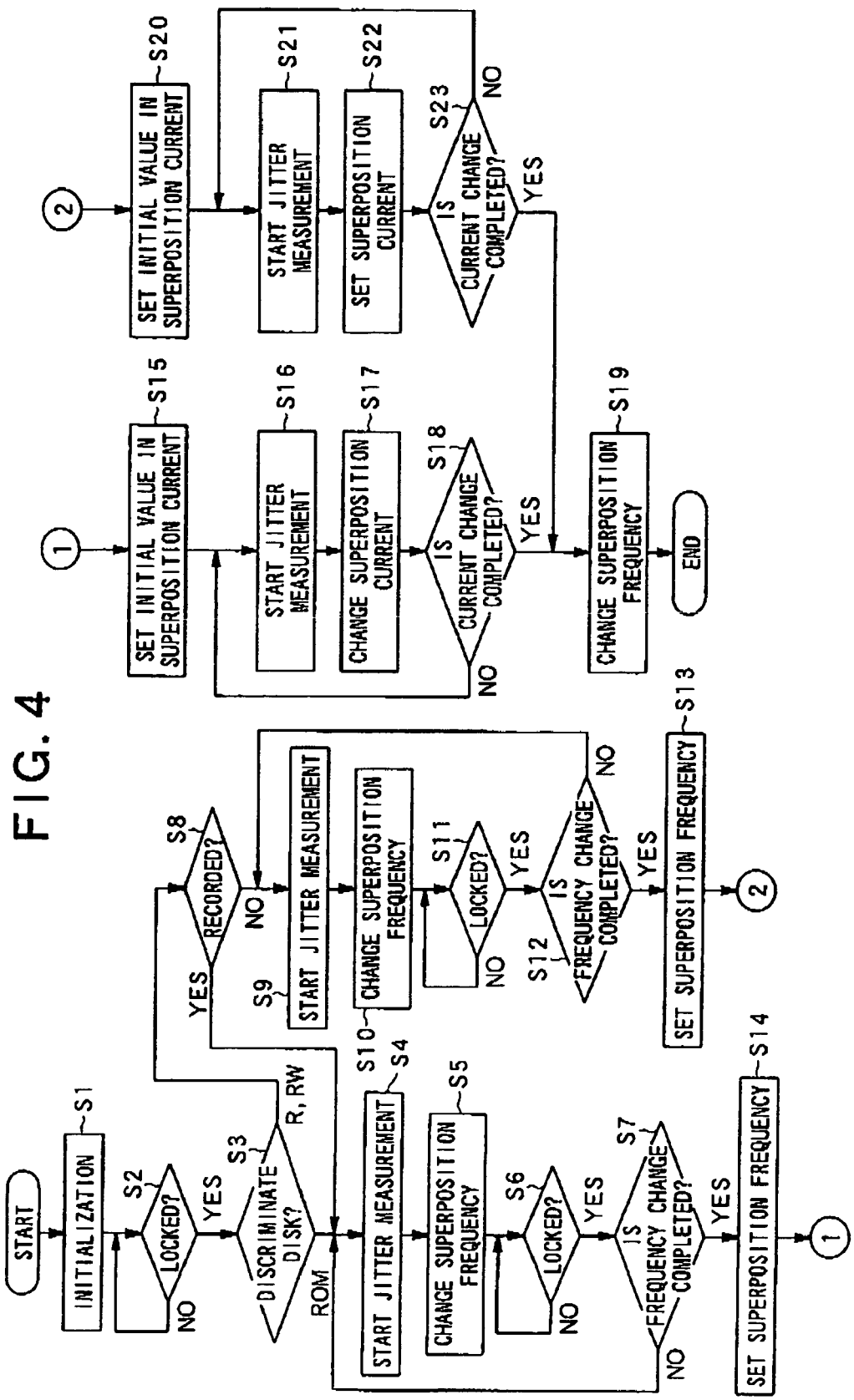
FIG. 4 is a flow chart for showing a frequency stabilization operation of a drive apparatus according to another embodiment.

Next, Embodiment 2 of the present invention is described in reference of FIG. 4. FIG. 4 is a flowchart for showing a frequency stabilizing operation according to a drive apparatus of Embodiment 2 In the flowchart shown in FIG. 4, steps similar to those in FIG. 3 are designated by similar numerical references, and detailed explanation thereof is omitted. Further, since the structure of a drive apparatus according to Embodiment 2 is similar to that of the drive apparatus D in Embodiment 1, detailed description thereof is omitted.

In the above Embodiment 1, the frequency of the superposition signal Shd is changed, the frequency at which the jitter amount in the reproduction signal Sd is minimized is detected, and the superposition signal Shd is superposed on the drive signal Sc. However, in the below described Embodiment 2, not only the frequency of a superposition signal Shd but also a superposition current is also optimized after optimizing the superposition frequency, and the superposition signal Shd is superposed on the drive signal Sc.

Namely, in the operation of generating an addition drive signal Sdv, Steps S1 to S7 in a process of setting a superposition frequency of the superposition signal Shd according to Embodiment 1 is first conducted to optimize the superposition frequency for a read-only optical disk DK in Step S14.

When the most suitable superposition frequency is set in Step S14, the superposition current is changed from a normal value set in Step 1 to an initial value in Step S15.

Next, information recorded in an optical disk currently loaded into an optical disk DK is again detected by a detector 16 and a reproduction process unit 17, and the jitter amount contained in the reproduction signal Sd corresponding to the detected information is started to be measured in Step S16.

Thereafter, the jitter amount contained in the light receipt signal Sp (reproduction signal Sd) and thus detected is temporarily stored a memory (not shown) in the CPU 6, and then the present superposition current is changed by a preset change amount in Step S17.

Next, it is confirmed whether or not the superposition frequencies have been changed in the entire preset change range of the superposition current in Step S18.

When the superposition currents are not completely changed in entire range to be changed along "NO" in Step S18, after temporarily storing the jitter amount which is obtained in superposing the superposition signal Shd on a drive signal Sc using the changed superposition currents which are obtained in the immediately preceding Step S17, the process is returned to Step S16 to measure the jitter amount for the superposition currents in the unchanged range. Meanwhile, when the entire range of the superposition currents, which should be changed, has already been changed along "YES" in Step S18, the superposition current having the least jitter among the superposition currents in the change range is set and registered as the superposition current used for the succeeding record and reproduction process into the CPU 6 in Step S19. Thus the settings of the superposition frequency and the superposition current in the semiconductor laser according to Embodiment 2 are complete.

On the other hand, in the discrimination in Step S3, when the record operation is continuously conducted along "R and RW" in Step S3, a process of Steps S8 to S12 as in the process of setting the superposition frequency of the superposition signal Shd according to Embodiment 1 is conducted to optimize the superposition frequency in the recordable optical disk Dk in Step S13.

When the most suitable superposition frequency is set in Step S13, the superposition signal is changed from the normal value set in Step S1 to its initial value in Step S20.

Next, the information stored in the optical disk DK presently loaded into the information record and reproduction apparatus is again detected in the detector 16 and the reproduction process unit 17 in a manner similar to that of the process in Step S9, and the jitter amount contained in the reproduction signal Sd corresponding to the detected information is started to be measured in Step S21.

Thereafter, when if the jitter amount contained in the light receipt signal Sp (reproduction signal) is detected, the jitter amount is temporarily stored in the memory (not shown) in the CPU 6. Then the present superpositon current is changed by as much as the preset change amount in Step S22.

Next, it is confirmed whether or not the changes of the superposition currents in the entire change range of the superposition currents is complete as the process in Step S23.

If the superposition currents are not changed in the entire change range in the determination of Step S23 along "NO" in Step S23, the superposition currents changed in the immediately preceding Step S22 are used to temporarily store the jitter amount which is obtained in superposing the superposition signal Shd on the drive signal Sc. Thereafter, the process returns to Step S21 to measure the jitter amounts of the unchanged range of the superposition currents. Meanwhile, when the superposition currents in the change range are entirely changed along "YES" in Step S23, the superposition signal having the least jitter amount is set and registered as the superposition current used for the succeeding record and reproduction process into the CPU 6 in Step S19. Thus the superposition frequency and the superposition current of the semiconductor laser according to Embodiment 2 are complete.

As for the maximum value of the superposition current in setting or in changing the processes of Steps S17,S19, and S22, it is necessary to make the maximum amount in a case where the optical disk DK is a recordable optical disk smaller than the maximum amount in a case where the optical disk DK is a read only optical disk.

As described above, according to a generation operation of a addition drive signal Sdv in the drive apparatus according to Embodiment 2, since in addition to the effects by the operations of the drive apparatus D according to Embodiment 1, not only the superposition frequency but also the super position current is also optimized, a further suitable superposition frequency in comparison with the drive apparatus D according to Embodiment 1 is obtainable in use of an actual reproduction result.

Further, since the superposition current is changed so that the maximum value of the superposition current when the optical disk is the recordable optical disk DK becomes smaller than the maximum value of the superposition current when the optical disk is the read only optical disk DK, the superposition current can be optimized without erasing the information already recorded in the recordable optical disk DK.

Embodiment 3

Figure 5:
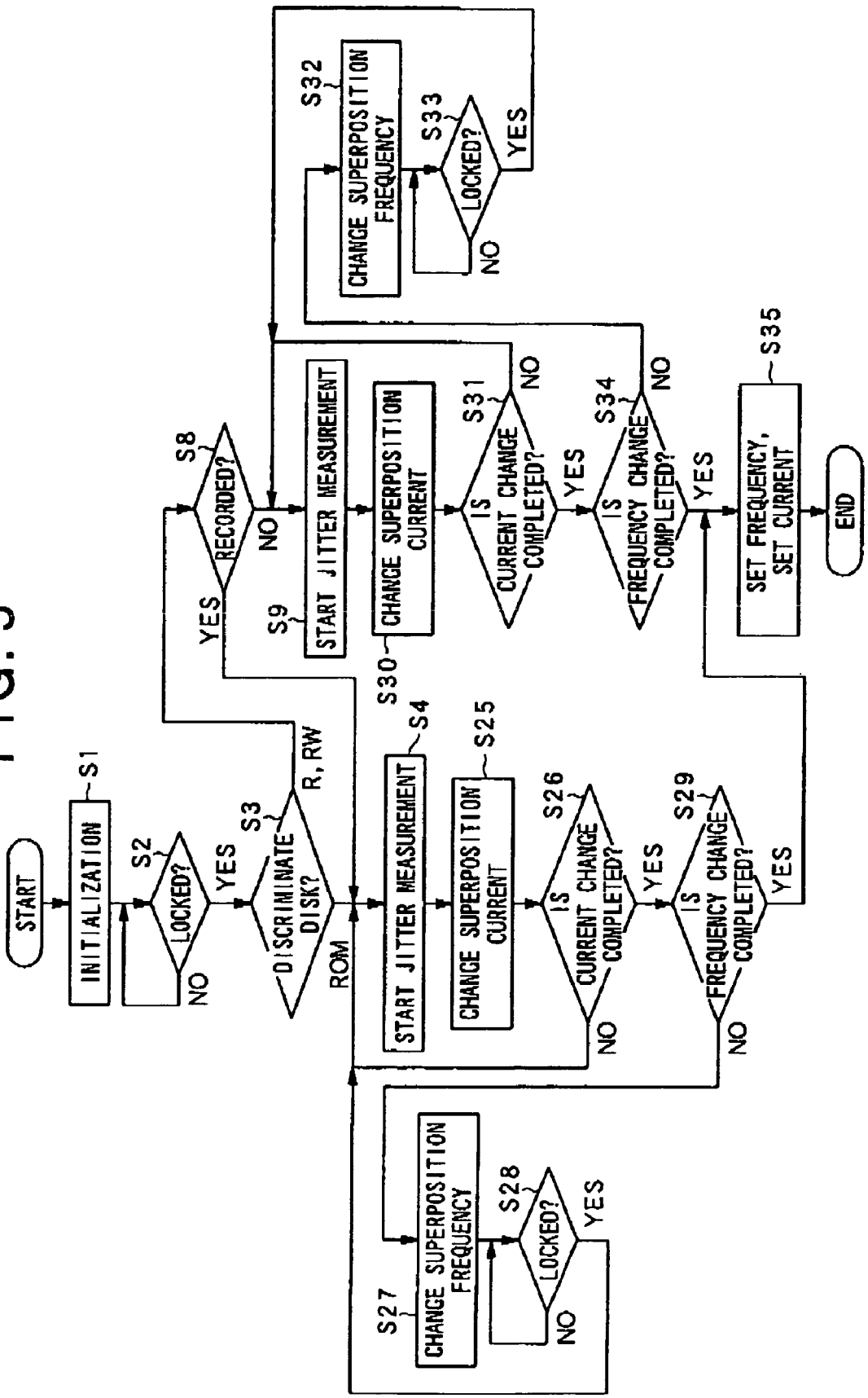
FIG. 5 is a flow chart for showing a frequency stabilization operation of a drive apparatus according to another embodiment.

Next, Embodiment 3 of the present invention is described in reference of FIG. 5. FIG. 5 is a flowchart for showing a frequency stabilizing operation according to a drive apparatus of Embodiment 3. In the flowchart shown in FIG. 5, steps similar to those in FIG. 3 are designated by similar numerical references, and detailed explanation thereof is omitted. Further, since the structure of a drive apparatus according to Embodiment 3 is similar to that of the drive apparatus D in Embodiment 1, detailed description thereof is omitted.

In the above mentioned Embodiment 2, although the superposition signal Shd is superposed on the drive signal Sc by optimizing the superposition current after optimizing the frequency of the superposition signal Shd and the superposition frequency, the superposition frequency and the superposition current are optimized in a different mode in the below described Embodiment 3.

In other words, a generation operation of the addition drive signal Sdv according to Embodiment 3 is first conducts a process of Steps S1 to S4 for setting a superposition frequency of a superposition signal Shd according to Embodiment 1 to start detection of a jitter amount of a read only optical disk DK in Step S4. In this, both of the superposition frequency and the superposition current are respectively set to be in initial value.

When the jitter amount contained in a light receipt signal Sp (reproduction signal Sd) is detected by the detection process of the jitter amount in Step S4, the detected jitter is temporarily stored in a memory (not shown) in the CPU 6, and the present superposition current is changed by as much as a preset change amount in Step S25.

Next, it is confirmed whether or not the change of the superposition current is complete in an entire preset change range of the superposition current as the process of Step S25 in Step S26.

When the superposition currents in the entire change range are not completely changed in the determination of Step S26 along "NO", after temporarily storing the jitter amount obtained when the superposition signal Shd is superposed on the drive signal Sc using the changed superposition signal obtained in the immediately preceding Step S25, the process returns to the above Step S4 to measure the jitter amount for the superposition currents in the unchanged range. Meanwhile, when the superposition currents have been changed for the entire change range along "YES" in Step S26, the superposition current having the minimum jitter amount within the superposition currents in the change range is temporarily set and registered in the CPU 6, and then it is confirmed whether or not changes of the superposition frequencies in the entire preset change range are complete in Step S29.

In determining Step S29, when the change of the superposition frequencies is not complete in the entire range along "NO" of Step S29, the superposition current of the time, i.e. the most suitable superposition current at the superposition frequency, is fixed. Then the present superposition frequency is changed by as much as a preset change amount in Step S27. It is confirmed whether or not the superposition frequency is stabilized in Step S28.

When it is not stable yet along "NO" in Step S28, a feedback operation is repeated in a PLL circuit 7 until it is stabilized. Meanwhile, when it is stabilized along "YES" in Step S28, the superposition frequency is optimized by repeating the process of the above Steps S4, S25, and S26 for the stabilized superposition frequency after returning to Step S4. After the optimization of the superposition frequency using the changed superposition current is complete along "YES" in Step S26, it is confirmed whether or not the superposition frequencies are changed for the entire preset change range of the superposition frequencies in Step S29.

When the superposition frequencies in the entire range have not been completely changed in the entire range along "NO" in Step S29, the process returns again to Step S27, and the entire changeable superposition frequencies and the entire changeable superposition currents are optimized by repeating the above Steps S27, S28, S4, S25, and S26.

Meanwhile, when the entire range of the superposition frequencies is completely changed in the determination along "YES" in Step S29, the superposition frequency and the superposition current having the minimum jitter amount among the superposition frequencies and the superposition currents of the change range are set and registered into the CPU 6 as the superposition frequency and the superposition current which are to be used for a record and reproduction process in Step S35.

On the other hand, in the discrimination of Step S3, when the record operation will be conducted in the following process along "R, RW" in Step S3, Steps S8 and S9 in setting the the superposition signal Shd according to Embodiment 1 are conducted, and the jitter amount is started to be detected for the recordable optical disk DK in Step S9.

When the jitter amount contained in the light receipt signal Sp (reproduction signal Sd) is detected by the jitter detection process in Step S9, the detected jitter amount is temporarily stored in a memory (not shown) in the CPU 6. Then the present superposition current is changed by as much as a preset change amount in Step S30.

Next, it is confirmed whether or not the preset superposition currents are completely changed in the entire change range of the superposition current in Step S31.

If the superposition currents are not changed in the entire change range in the determination of Step S31 along "NO" in Step S31, the superposition currents changed in the immediately preceding Step S30 are used to temporarily store the jitter amount which is obtained in superposing the superposition signal Shd on the drive signal Sc. Thereafter, the process returns to Step S9 to measure the jitter amounts of the unchanged range of the superposition currents. Meanwhile, when the superposition currents in the change range are entirely changed along "YES" in Step S31, the superposition signal having the least jitter amount is temporarily set and registered as the superposition current used for the succeeding record and reproduction process into the CPU 6 in Step S19. Then it is confirmed whether or not the changes of the superposition frequencies are complete for the preset change range of the superposition frequencies in Step S34.

In determining Step S34, when the change of the superposition frequencies is not complete in the entire range along "NO" of Step S34, the superposition current of the time, i.e. the most suitable superposition current at the superposition frequency, is fixed. Then the present superposition frequency is changed by as much as a preset change amount in Step S32. It is confirmed whether or not the superposition frequency is stabilized in Step S33.

When it is not stable yet along "NO" in Step S33, a feedback operation is repeated in a PLL circuit 7 until it is stabilized. Meanwhile, when it is stabilized along "YES" in Step S33, the superposition frequency is optimized by repeating the process of the above Steps S9, S30, and S31 for the stabilized superposition frequency after returning to Step S9. After the optimization of the superposition frequency using the changed superposition current is complete along "YES" in Step S31, it is confirmed whether or not the superposition frequencies are changed for the entire preset change range of the superposition in Step S34.

When the superposition frequencies in the entire range have not been completely changed in the entire range along "NO" in Step S34, the process returns again to Step S32, and the entire changeable superposition frequencies and the entire changeable superposition currents are optimized by repeating the above Steps S32, S33, S9, S30, and S31.

Meanwhile, when the entire range of the superposition frequencies is completely changed in the determination along "YES" in Step S34, the superposition frequency and the superposition current having the minimum jitter amount among the superposition frequencies and the superposition currents within the change range are set and registered into the CPU 6 as the superposition frequency and the superposition current which are to be used for a record and reproduction process in Step S35. Thus the process of setting the superposition frequency and the superposition current of the semiconductor laser according to Embodiment 3 are complete.

As described above, according to the generation operation of the addition drive signal Sdv in the drive apparatus concerning Embodiment 3, an effect similar to that in the operation of the drive apparatus according to Embodiment 2 is obtainable, and it is possible to accelerate an optimizing process of the superposition current and the superposition frequency.

Although the superposition frequency is optimized after the superposition current is optimized in the generation operation of the addition signal Sdv concerning the above mentioned Embodiment 3, the superposition frequency is optimized first by fixing the superposition current to a certain value and then the fixed superposition current is changed later. In this case also, it is also possible to demonstrate an effect similar to that in Embodiment 3.

Embodiment 4

Figure 6:
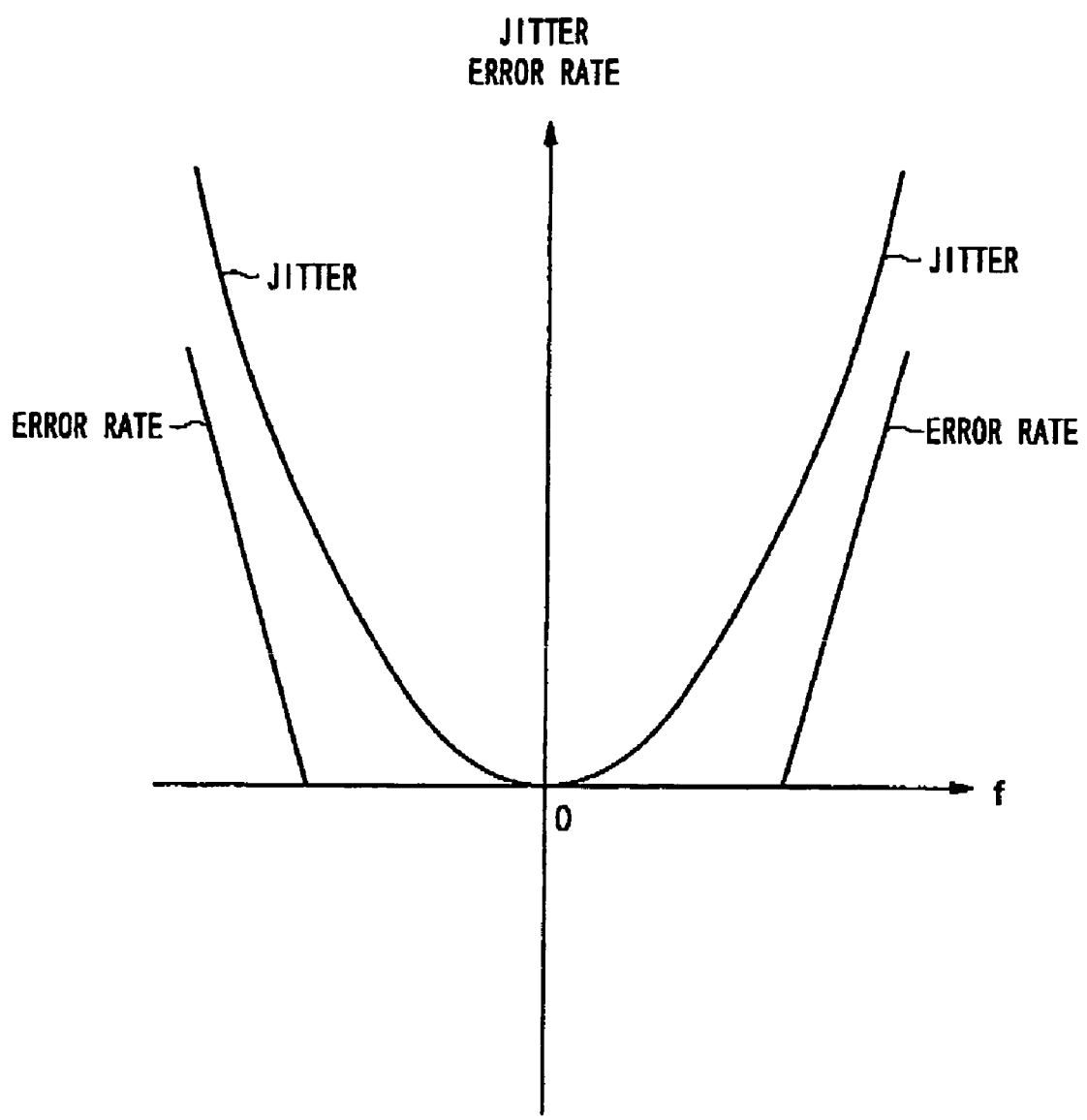
FIG. 6 is a graph for explaining variations of a jitter value and an error rate with respect to a superposition frequency.

In the above mentioned embodiments, the jitter amount contained in the reproduction signal Sd is used as a quality index of the reproduction signal Sd. However, it is possible to optimize a superposition current and a superposition frequency instead using an error rate in the reproduction signal Sd. In this case, when for example a superposition frequency is optimized as shown in FIG. 6, although the superposition frequency having the least jitter amount is uniquely determined in a case where the jitter amount is used as the quality index but the superposition signal having the least error rate is determined within a certain range in a case where the error rate is used as the quality index. Accordingly, it is possible to freely determine the optimum value in a certain range respectively for the superposition current and the superposition frequency.

Further, by recording programs corresponding to the flowcharts shown in FIGS. 3 to 5 in an information record medium such as a flexible disk or a hard disk and by obtaining and recording such a program from a network such as an internet, it is possible to use a general purpose computer for reading out and executing the programs as the CPU 6 concerning the CPU 6 according to the above Embodiments.

The present invention is not confined to the configurations listed in the foregoing embodiments, but it is easily understood that the person skilled in the art can modify such configurations into various other modes, within the scope of the present invention described in the claims.

The entire disclosures of Japanese Patent Applications No. 2004-75219 filed on Mar. 16, 2004 including the specification, claims, drawings and summary are incorporated herein by reference in its entirety.

What is claimed is:

1. A drive apparatus comprising:
   a superposition device which superposes a superposition signal on a drive signal for driving a light beam emission device that emits a light beam and which outputs the drive signal on which the superposition signal is superposed to the light beam emission device,
   a reference clock signal generation device which generates a reference clock signal,
   a frequency change device which changes a frequency of the superposition signal based on a quality index for indicating a quality of a reproduction signal that is obtained from a reflection light that is the light beam reflected on a record medium,
   a phase locked loop device which controls the changed frequency so as to be constant by a feedback method in use of the generated reference clock signal.

2. The drive apparatus according to claim 1, further comprising:
   a dividing unit included in the phase locked loop device, wherein
   the frequency change device changes the frequency by changing a dividing ratio in the dividing unit.

3. The drive apparatus according to claim 1, wherein
   the frequency change device changes the frequency in use of the reference clock signal and the dividing ratio of the reference clock signal.

4. The drive apparatus according to claim 1, further comprising:
   a current change device which changes the current of the superposition signal based on the quality index.

5. The drive apparatus according to claim 4, further comprising:
   a discrimination device which discriminates whether or not a record medium is a recordable record medium, wherein
   the current change device changes the current so that the current for the recordable record medium is smaller than a current for a read only record medium as the record medium.

6. The drive apparatus according to claim 1, wherein
   the quality index is an error rate or a jitter amount in the reproduction signal.

7. An information apparatus comprising:
   the drive apparatus according to claim 1, wherein
   information is at least recorded onto or reproduced from a recording medium with the emitted light beam.

8. A drive method comprising:
   a superposition step for superposing a superposition signal on a drive signal for driving light beam emission device which emits a light beam and for outputting the drive signal on which the superposition signal is superposed to the light beam emission device,
   a reference clock signal generation step for generating a reference clock signal,
   a frequency change step for changing a frequency of the superposition signal based on a quality index for indicating a quality of a reproduction signal that is obtained from a reflection light that is the light beam reflected on a record medium, and
   a control step for controlling the changed frequency so as to be constant by a feedback method in use of the generated reference clock signal using a phase locked loop device.

9. The drive method according to claim 8 further comprising:
   a current change step for changing a current of the superposition signal based on the quality index.

10. A computer readable recording medium embodied with a computer program and representing a sequence of instructions, which when executed by a computer included in a drive apparatus, the instructions cause the computer to function as:
    a superposition device which superposes a superposition signal on a drive signal for driving a light beam emission device that emits a light beam and which outputs the drive signal on which the superposition signal is superposed to the light beam emission device;
    a reference clock signal generation device which generates a reference clock signal;
    a phase locked loop device which controls a changed frequency so as to be constant by a feedback method in use of the generated reference clock signal; and
    a frequency change device which changes a frequency of the superposition signal based on a quality index for indicating a quality of a reproduction signal that is obtained from a reflection light that is the light beam reflected on a record medium.

11. The computer-readable recording medium according to claim 10, wherein
    the computer driven to work also as a current change device which changes a current of the superposition signal based on the quality index.

* * * * *